US006981005B1

(12) United States Patent
Cabrera et al.

(10) Patent No.: US 6,981,005 B1
(45) Date of Patent: Dec. 27, 2005

(54) PARTIAL MIGRATION OF AN OBJECT TO ANOTHER STORAGE LOCATION IN A COMPUTER SYSTEM

(75) Inventors: Luis Felipe Cabrera, Bellevue, WA (US); Deborah C. Jones, Bothell, WA (US); Ravisankar Pudipeddi, Redmond, WA (US); Stefan R. Steiner, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 09/644,667

(22) Filed: Aug. 24, 2000

(51) Int. Cl.⁷ .............................................. G06F 17/30
(52) U.S. Cl. ...................................... 707/203; 707/1
(58) Field of Search .............................. 707/200–205, 707/1–10, 100–104.1; 711/117; 714/20; 709/231, 213

(56) References Cited

U.S. PATENT DOCUMENTS

| | | | | |
|---|---|---|---|---|
| 5,564,037 A | * | 10/1996 | Lam | 711/161 |
| 5,644,766 A | * | 7/1997 | Coy et al. | 707/204 |
| 5,784,646 A | * | 7/1998 | Sawada | 710/38 |
| 5,802,599 A | * | 9/1998 | Cabrera et al. | 711/170 |
| 5,832,522 A | * | 11/1998 | Blickenstaff et al. | 707/204 |
| 5,864,683 A | * | 1/1999 | Boebert et al. | 709/249 |
| 5,881,311 A | * | 3/1999 | Woods | 710/4 |
| 5,897,661 A | * | 4/1999 | Baranovsky et al. | 711/170 |
| 5,918,229 A | * | 6/1999 | Davis et al. | 707/10 |
| 5,953,729 A | * | 9/1999 | Cabrera et al. | 707/204 |
| 5,987,506 A | * | 11/1999 | Carter et al. | 709/213 |
| 6,233,600 B1 | * | 5/2001 | Salas et al. | 709/201 |
| 6,269,382 B1 | * | 7/2001 | Cabrera et al. | 707/204 |
| 6,311,252 B1 | * | 10/2001 | Raz | 711/117 |
| 6,343,265 B1 | * | 1/2002 | Glebov et al. | 703/25 |
| 6,377,996 B1 | * | 4/2002 | Lumelsky et al. | 709/231 |
| 6,385,706 B1 | * | 5/2002 | Ofek et al. | 711/162 |
| 6,499,039 B1 | * | 12/2002 | Venkatesh et al. | 707/204 |

OTHER PUBLICATIONS

Tommie Usdin and Tony Graham, "XML: Not a Silver Bullet, but a Great Pipe Wrench", StandardView Sep. 1998, vol. 6 No. 3 pp. 125-132.*
Rakesh D. Barve and Jeffrey Scott Vitter. "A Simple and Efficient Parallel Disk Mergesort". Jun. 1999, ACM 1999. pp. 232-241.*
Melanie Chams, Thomas Lee, Stuart Madnick, Robert Nado, Michael Siegel. "Information Integration with Attribution Support for Corporate Profiles". Nov. 1999. ACM. pp. 423-429.*

* cited by examiner

Primary Examiner—Mohammad Ali
(74) Attorney, Agent, or Firm—Woodcock Washburn LLP

(57) ABSTRACT

A technique is provided whereby a stream of data located in a first storage location is registered for migration administration and according to preset criteria, portion(s) of the stream of data that are suited to another storage location are migrated to maximize system storage efficiencies. The file system may have use of facilities that enable the monitoring of files/streams that have been registered for migration administration or files/streams may be polled according to preset criteria. If the stream of data has portions to migrate to another storage location, the hierarchical storage management (HSM) system migrates the data to the other storage location, such as to long term or off-line storage, and preserves the data relationships of the stream via metadata. The technique allows for multiple volumes to be spanned by the migration target location, and multiple file systems may service the source and target.

45 Claims, 9 Drawing Sheets

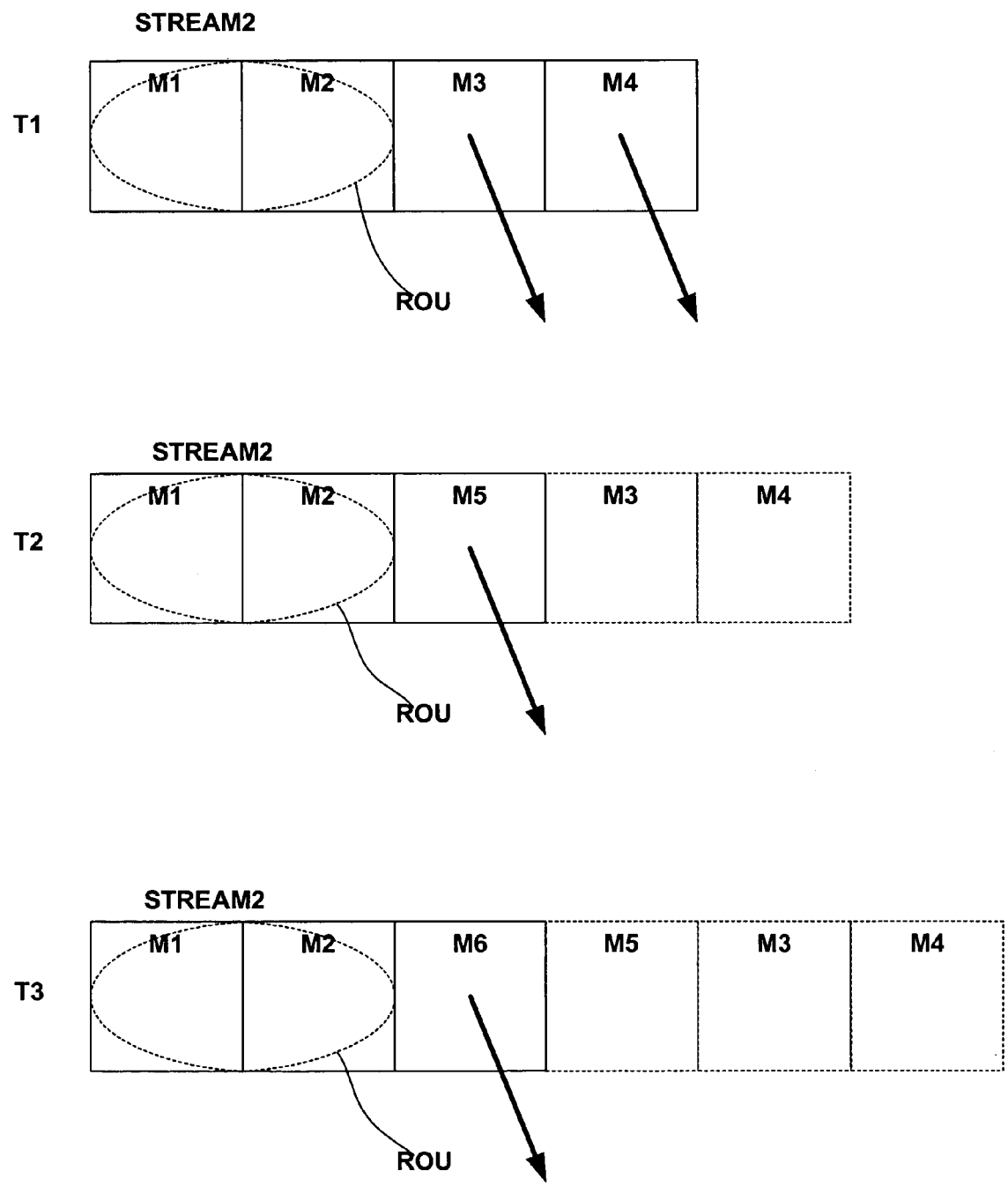

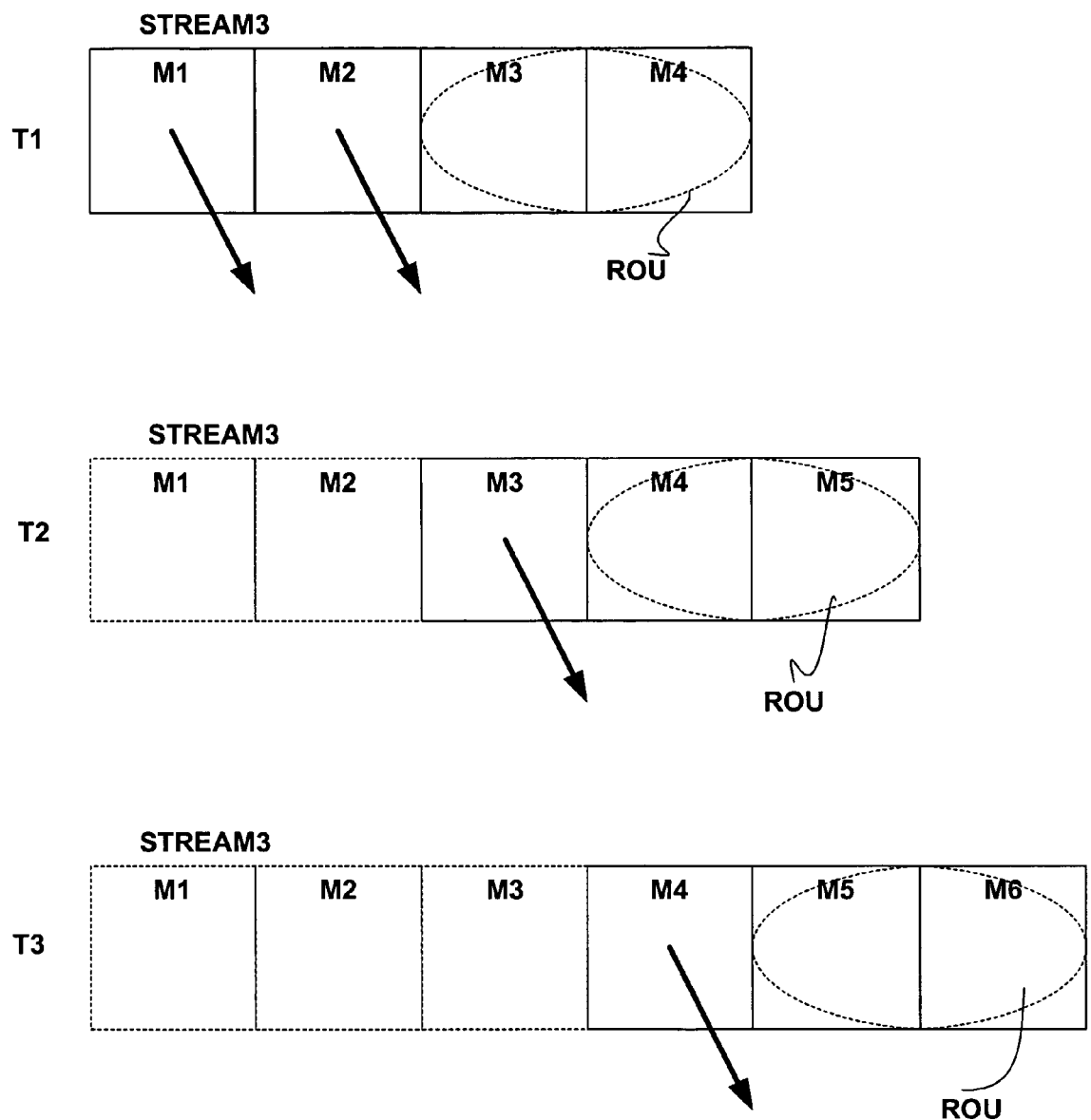

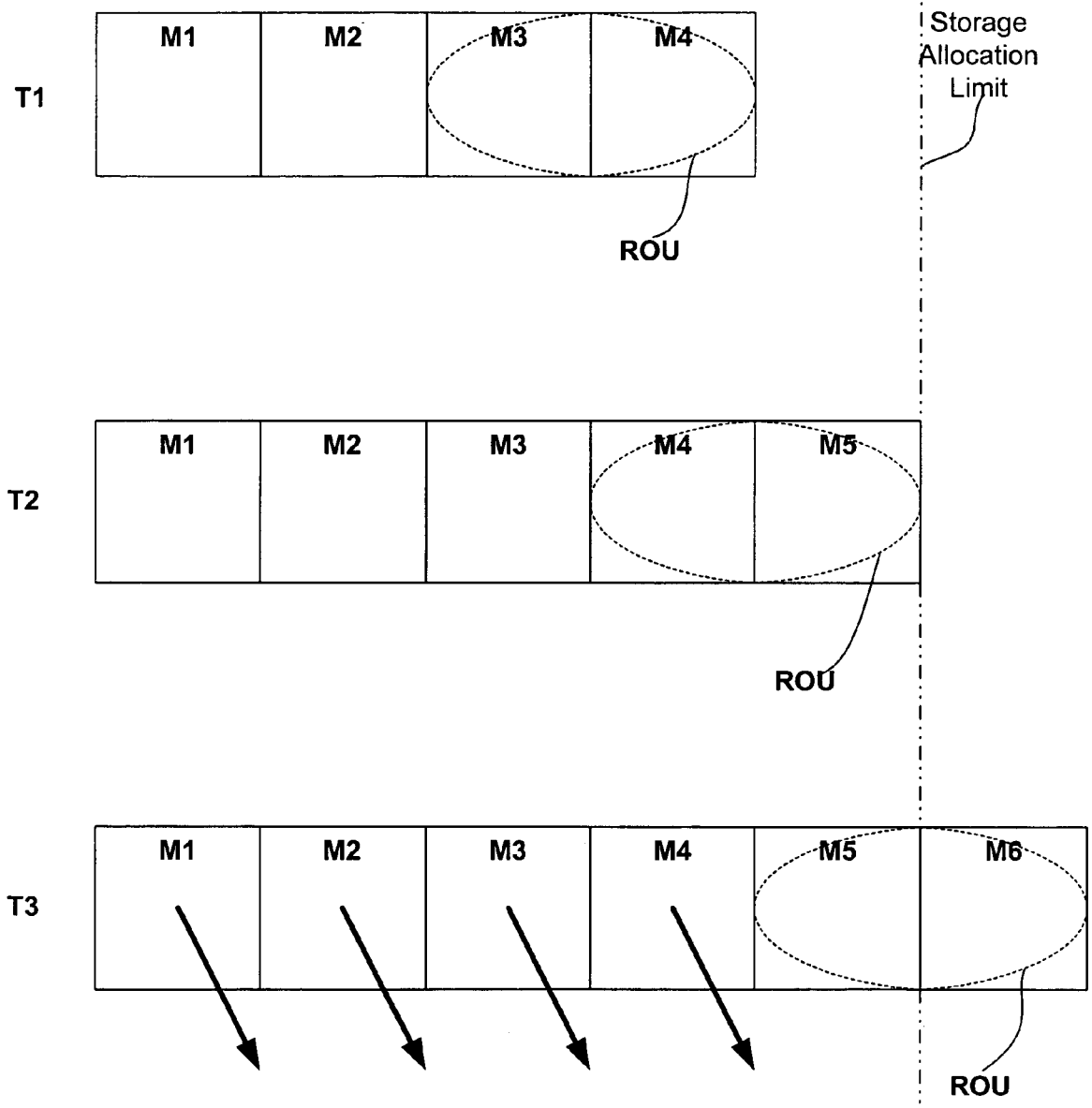

PARTIAL MIGRATION OF AN OBJECT TO ANOTHER STORAGE LOCATION IN A COMPUTER SYSTEM

BACKGROUND OF THE INVENTION

1. Field of the Invention

The present invention relates to storage operations and management in a computer system. More particularly, the present invention relates to a method and system for migrating portions of an object from a base or root location to a remote location, while still maintaining the data relationships of the object.

2. Brief Description of Related Developments

Since its advent, the model of a standalone personal computer with removable storage media has had a great effect on the computer industry and has influenced the design of computer system architectures and infrastructures. However, advances in storage solutions and complex computer systems have been occurring rapidly since the time of the first standalone computers. The following are all examples of the increased functionality that networked computer environments have evolved to possess: continued discovery of smaller and smaller integrated circuits and semiconductor chips capable of storing ever increasing quantities of data, increased bandwidth and data transfer rates possible with today's computer networks and increased utilization of server computers in a network in connection with other computers, databases, applications and storage components of all types.

As a consequence, traditional computing and storage techniques and models have been challenged. The widespread use of removable storage media, for example, has been challenged by the ability to remotely store files efficiently and inexpensively. Furthermore, as computer systems have evolved, so has the availability and configuration of data storage devices, such as magnetic or optical disks. For example, these storage devices can be connected to the computer system via a bus, or they can be connected to the computer system via a wired or wireless network. In addition, the storage devices can be separate or co-located in a single cabinet.

As background, a storage volume is a software abstraction of the underlying storage devices and is the smallest self-contained unit of storage mounted by an operating system and administered by the file system. Storage volumes abstract the physical topology of their associated storage devices and may be a fraction of a disk, a whole disk or even multiple disks that are bound into a virtually contiguous range of logical blocks. This binding may increase the fault tolerance, performance, or capacity characteristics of the underlying devices. In today's complex computer system environments, storage volumes can be a diverse set of elements for which efficient and effective management is desirable. A file server for a computer system capable of diverse storage operations maintains and keeps track of data relationships and locations for stored objects, so that common techniques for data storage and transfer may be employed.

Volumes are constructed from one or more extents that are contiguous storage address spaces presented by the underlying storage devices. An extent is typically characterized by the size of the address space and a starting offset for the address space from a base of the media. Volume mapping is the process of mapping contiguous address space presented by the volume onto the non-contiguous storage address spaces of the underlying extents. Volume mappings are either implemented on a specialized hardware controller, referred to as a hardware volume provider, or in software by a software volume provider. By way of further background, a technique for common administration and management of volume providers is provided in commonly assigned copending application Ser. No. 09/449,577, entitled "Administration of RAID Storage Volumes."

Advances in storage techniques are thus changing the ways in which data can be stored or transferred, thereby placing a strain on the traditional management of files within and between volumes. For instance, files with arbitrary growth criteria, volumes with memory allocation limits, distributed storage and data transferring, and the like challenge the notion of a standalone computer's fixed on-disk memory allocations and management. The shifting of data from fast, volatile memory to remote, robust storage is quite advantageous for certain objects. Thus, advances in networks and computer system models have greater ramifications than simply resulting change in the types of storage components being utilized and in the connections being used between the storage components.

Previously implemented fixed or inflexible memory allocation for volumes do not begin to tap into the efficiencies that may be gained from a robust mechanism for transferring and storing data among a plurality of volumes in a networked computer environment. Techniques traditionally used to manage file transfers were not originally designed to support all of the increased functionality of today's complex network environments. Operating systems, system infrastructure and core file management functions with which many computers operate have thus been affected. As a consequence, current file systems have lingering inefficiency associated therewith and are not equipped to handle all different types of storage and data transfer operations with maximum efficiency.

One such inefficiency exists in connection with storing portion(s) of an object or file away from the root location of the object, for example, to remote storage. With the proliferation of various storage elements and techniques as described above, sometimes it becomes desirable to store portion(s) of a file in remote storage while retaining portion(s) in local storage. This may be desirable, for example, to free up more valuable local storage when portions of a file are known to be static, or to stow away certain data that is infrequently utilized. For another example, an append only file has the characteristic that data writes occur only at the end of the file. Consequently, an efficient use of local storage may dictate that the immutable portions of the file, to which new writes are appended, be migrated to remote storage. For yet another example, migration of data to remote storage might be effected to preserve pre-set on-line disk/memory allocation limits. Thus, there are a variety of reasons why a file may have some data that should be migrated to remote storage. Current file serving techniques, however, do not adequately address either specifying when portions(s) of a file should be migrated or the subsequent migration of data to remote locations while maintaining the file's data relationships.

Thus, as a general rule, partial migration techniques have not been thus far used; nonetheless, it should be noted that there are presently some hierarchical storage management (HSM) systems that can perform limited partial file operations, such as a partial recall. In a traditional HSM system, e.g., an entire on-disk volume may be updated without having to recall any data from remote storage using partial recall operations. Other conventional techniques have addressed the limited case wherein the first few kilobytes of a file, e.g. 4 Kb, are left on-line or 'unmigrated', and also the case wherein the last few kilobytes of a file are left on-line or 'unmigrated.'

However, the current state of the art in hierarchical storage management for files does not cover partial migration of files in most contexts, nor does it address the desire to migrate predetermined part(s) of files from one location to another while retaining other part(s) of files. Further unaddressed by the art is the desirability of a mechanism that specifies those regions of a data stream suited to writes and updates and those regions of a data stream suited to off-line or remote storage. In short, sometimes it is desirable to migrate predetermined part(s) of files to remote storage and to retain other part(s) in local storage and current file servers do not specify which data to keep and which data to export elsewhere.

Additionally, the current state of the art in file management does not address the specific case wherein it is desirable to apply a limit to on-line disk/memory allocations for certain data streams while allowing the entire stream to grow arbitrarily e.g., as might be the case for an append-only data structure. To illustrate, it might be desirable to maintain up to one megabyte of a stream in an on-line volume while allowing the total stream to have a size that is greater than one megabyte. This case is not addressed by today's hierarchical storage management systems.

In consideration of the above insufficiencies associated with current file server/HSM systems, it would be desirable to provide a flexible architecture in a computer system for partially migrating some portion(s) of a file or object to another memory location and retaining other portion(s) of the file. It would be advantageous to be able to specify according to pre-set criteria which portion(s) of an object are suited to migration and which are suited to their present storage location. It would be advantageous to allow for partial migration of files or objects from a first storage location to a second storage location, e.g., from on-line storage to remote storage. It would be still further advantageous to achieve efficient partial migration for files whose structure and properties are known or can be specified as with, for example, append only type files. Thus, a common approach does not exist to move portion(s) of files or objects from a root volume to another or remote volume while maintaining the various data relationships of the file or object. The present invention has been developed in consideration of these needs in the art.

SUMMARY OF THE INVENTION

The present invention relates to hierarchical storage management (HSM) systems used in connection with computer systems. A technique is provided whereby a stream of data located in a first storage location is registered for migration administration and according to preset criteria, portion(s) of the stream of data that are suited to another storage location are migrated to maximize system storage efficiencies. The file system may have use of facilities that enable the monitoring of files/streams that have been registered for migration administration or files/streams may be polled according to preset criteria. If the stream of data has portions to migrate to another storage location, the HSM system migrates the data to the other storage location, such as to long term or off-line storage, and preserves the data relationships of the stream via metadata. The technique allows for multiple volumes to be spanned by the migration target location, and for access to the source and target portions of the migrated file/stream via the HSM system and the metadata. In an exemplary embodiment, data is migrated to sequential access media.

Other features of the present invention are described below.

BRIEF DESCRIPTION OF THE DRAWINGS

The system and methods for partially migrating portion(s) of an object to remote storage are further described with reference to the accompanying drawings in which:

FIGS. 3A through 3D illustrate the migration of exemplary archive units based on a stream's region(s) of updates in accordance with the present invention.

DETAILED DESCRIPTION OF PREFERRED EMBODIMENTS

Figure 1:
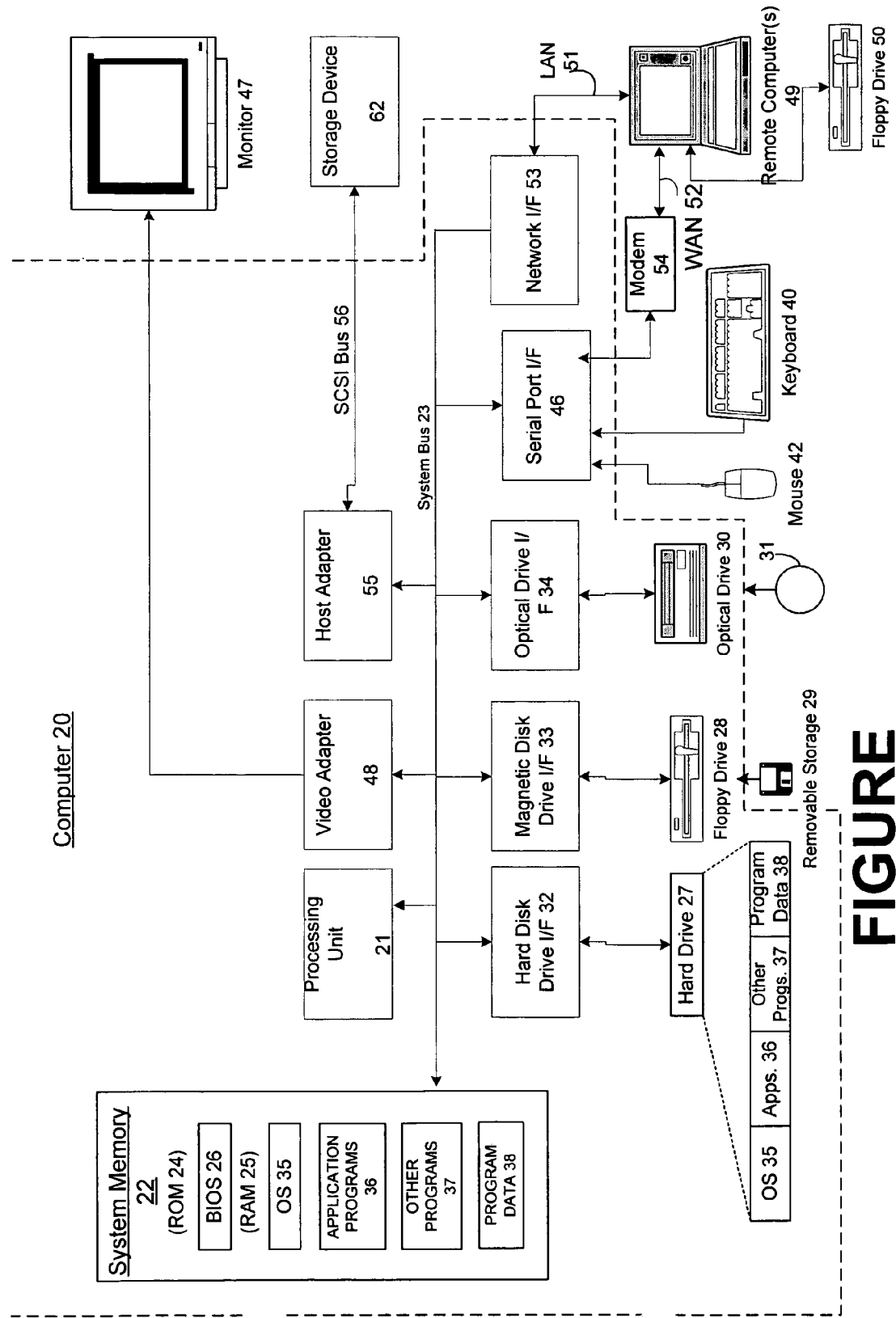
FIG. 1 is a block diagram representing a general purpose computer in which aspects of the present invention may be incorporated.

The present invention relates generally to systems in which the partial migration of files from one location to another is desirable. The present invention may be utilized in conjunction with a system's pre-existing file server. Advantageously, the present invention may be employed to provide or specify an on-disk allocation limit for use in the migration of portion(s) of files. The present invention may be thus utilized to migrate portion(s) of files that are in excess of an on-disk limit to off-disk storage, such as sequential access media (SAM). In particular, the invention enables partial migration of data streams to remote storage as they grow beyond an allotted disk allocation quota, or limit. The invention thus provides specialized hierarchical storage management for various data streams associated with a file, wherein a data stream may be registered for migration administration. The part of the stream of data that has been migrated can then be recalled and read, similarly to a traditional HSM system partial recall operation. In an exemplary embodiment, the present invention includes the use of SAM for a target location.

Exemplary data streams, objects or files for which it is desirable to migrate portion(s) thereof to another storage location include append-only files such as files for which writes are performed only to the last storage block, files that have a defined "region of updates" such as files for which writes occur only in the first storage block or other identifiable storage block, files for which portion(s) are accessed or read infrequently, streams of data for which it is desirable to store portion(s) immutably in robust and/or remote storage, files located in a storage location that places constraints on the file's growth, such as by enforcing on-disk memory allocation limits, streams of data for which growth will be arbitrary or unpredictable, and the like.

Exemplary migration source location and migration target location pairs include the migration of portion(s) of data streams, objects or files from on-line storage to off-line storage, from local storage to remote storage, from volatile storage to non-volatile storage, from non-secure memory to secure memory, and the like.

The present invention thus relates to hierarchical storage management (HSM) systems used in connection with computer systems. A stream of data located in a first storage location may be analyzed according to preset criteria to determine whether the stream of data has portion(s) suited to another storage location, to maximize system storage efficiencies. The preset criteria, such as migration archive unit size and location of a region of update, may be pre-specified according to system characteristics or may be entered by the user. The file system may have use of facilities that permit the monitoring of files that have been registered for migration administration. If the file system does not provide a method for monitoring streams/files, a method could be implemented whereby the streams/files that are registered for migration are polled at predefined intervals to obtain information about further migration needs, which intervals could be altered dynamically to suit the migration characteristics of the system. If the stream of data has portions to migrate to another storage location, the file server HSM system migrates the data to the other storage location and preserves the relationships between the migrated data and the stream of data in the first storage location. These relationships may be preserved via metadata generated in connection with the migration of those portions. This metadata may then later be utilized in connection with the HSM system later accessing the migrated data. Multiple volumes may be spanned by the migrated data target location, and multiple file systems may be implicated in doing so.

As mentioned, the present invention provides a way to migrate portion(s) of a data stream or object suited to another storage location according to preset criteria. The preset criteria may be set in a variety of ways. In an exemplary implementation, the invention includes a method of providing an on-disk allocation limit. The allocation limit, e.g., can be specified on a per stream or per file basis such that the limit may be enforced for a data stream. For example, the size of an archive unit may be specified, and then a user account quota can be specified in terms of the size of a file's region of updates. Other files for migration administration may be files accessed in an append only mode or files having another identifiable "region of updates."

The invention thus provides a method for migrating parts of files having an identifiable region of updates to remote storage. The present invention advantageously may be employed to provide on-disk allocation limits by partially migrating portion(s) of files in excess of an on-disk limit to SAM. In particular, the invention allows partial migration of data streams to remote storage as they grow beyond an allotted disk allocation quota, or limit from a first storage location to a second storage location. In an exemplary embodiment, the present invention addresses this allocation constraint by migrating data in excess of the on-line storage limit to remote storage and this is achieved by migrating it to SAM.

The present invention thus has been developed in contemplation of the efficient integration of partial migration capabilities and current HSM systems. In particular, the present invention has been developed to efficiently perform file migration operations from a first storage location to other storage location(s).

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
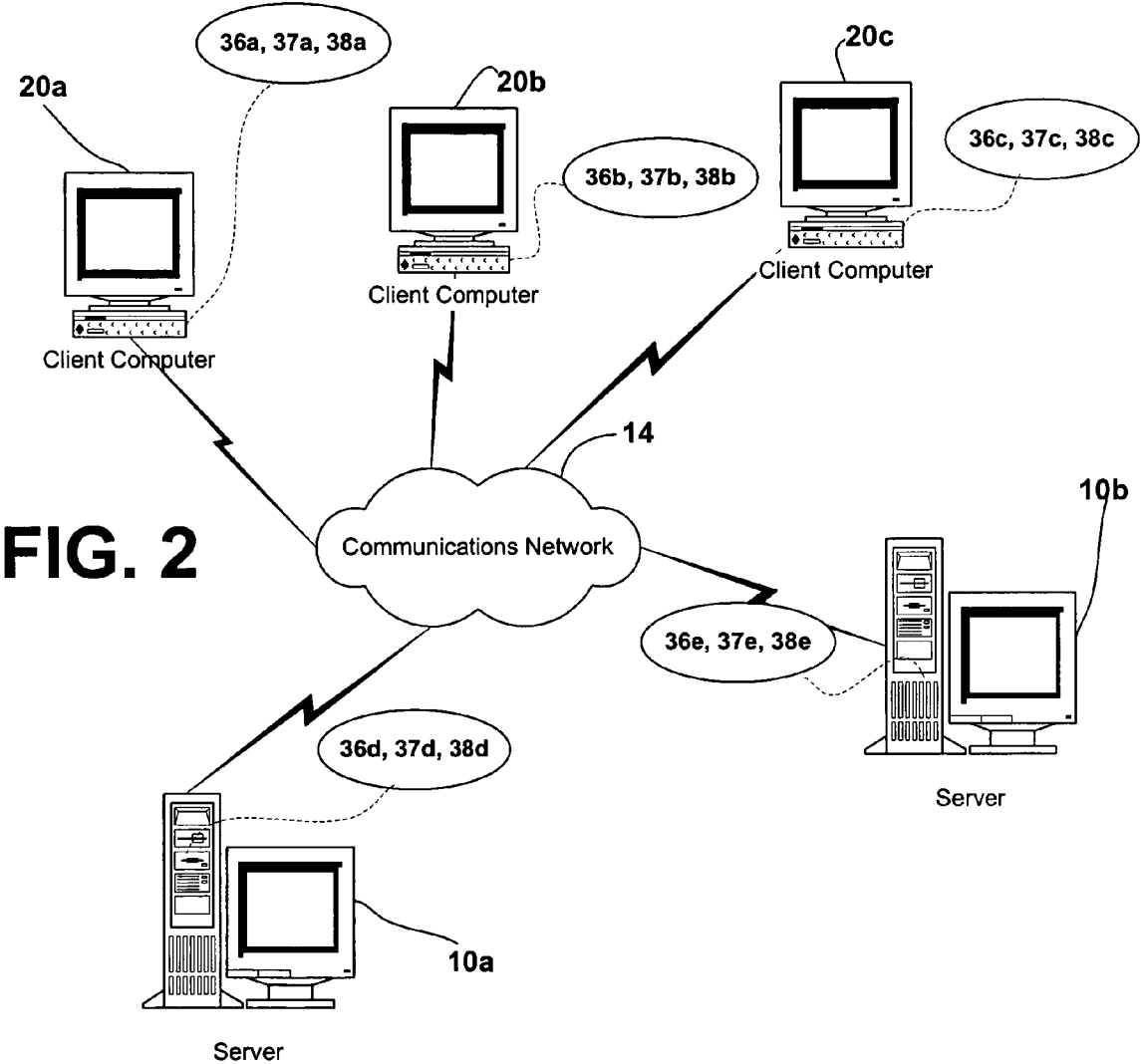
FIG. 2 is a block diagram representing an exemplary network environment in which the method and apparatus of the present invention may be implemented.

It should be noted that the computer described above can be deployed as part of a computer network, and that the present invention pertains to any computer system having any number of memory or storage units, and any number of applications and processes occurring across any number of volumes. Thus, the present invention may apply to both server computers and client computers deployed in a network environment, having remote or local storage. FIG. 2 illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 20a, 20b, 20c, etc. In a network environment in which the communications network 14 is the Internet, for example, the servers 10 can be Web servers with which the clients 20 communicate via any of a number of known protocols such as hypertext transfer protocol (HTTP).

Each client computer 20 and server computer 10 may be equipped with various application program modules 36, other program modules 37 and program data 38, and with connections or access to various types of storage elements or objects, across which files may be stored or to which portion(s) of files may be migrated.

Thus, the present invention can be utilized in a computer network environment having client computers for accessing and interacting with the network and a server computer for interacting with client computers. In accordance with the present invention, improved HSM system techniques are used to migrate portion(s) of data streams and generate metadata for description of the migration. These techniques and communications incident thereto can be implemented with a variety of network or system architectures, and thus should not be limited to any particular format.

Thus, the present invention efficiently implements a flexible architecture in a computer system for partially migrating some portion(s) of a data stream, file or object and retaining other portion(s) of the file. A method is provided for specifying which portion(s) of an object are suited to migration and which are suited to local, base or root storage according to preset criteria. A method is provided for partial migration of files or objects from a first storage location to a second storage location, e.g., from on-line storage to remote storage. Exemplary criteria for partial migration include files whose structure and properties are known as with, for example, append-only type files, files with an otherwise identifiable region of updates, files with memory allocation constraints, and the like. A common approach is provided via the HSM system to move portion(s) of files or objects from a root volume to a remote or other volume while maintaining the various data relationships for the file or object. The present invention is an improvement over prior file systems that do not adequately address the efficiencies that can be gained from the partial migration of files, and the provision of on-disk allocation quotas.

The methods of the present invention can be implemented, for example, in conjunction with a system's file server as can any of the partial migration techniques of the present invention. By utilizing a storage quota mechanism, the HSM system can determine when it is desirable to migrate data to remote storage. The preset criteria can be based on other or further predetermined rules as well, such as time since data access, pre-knowledge about source file and/or target file data structures, system conditions and the like. This choice as to which data is migrated is thus left to the HSM system, and a user may specify criteria for that choice including an archive unit size or an on-disk allocation quota. Stream size constraints may thus be specified or constraints may already be imposed by the characteristics of the storage location itself. The invention will adhere to the greater restraint on allocation unit size. In this regard, if there are file system quotas imposed on a storage location that are smaller (smaller maximum size allocation unit) than an on-disk allocation limit specified in accordance with the present invention, the invention will preserve these constraints. If the file system's quota is greater than an on-disk allocation quota specified in accordance with the present invention, the quota of the present invention preempts the quota of the file system. Another way to specify files for migration administration is to determine whether the file is accessed in an append only mode or when the file has another identifiable "region of updates." The policy maintained for the partial migration of files may be re-evaluated based on file usage history and other dynamic system characteristics. For example, if it is found that a certain on-disk memory allocation limit were too severe for any one of a variety of reasons, the limit could be relaxed, and a more efficient amount of data may be migrated instead.

Figure 3A:
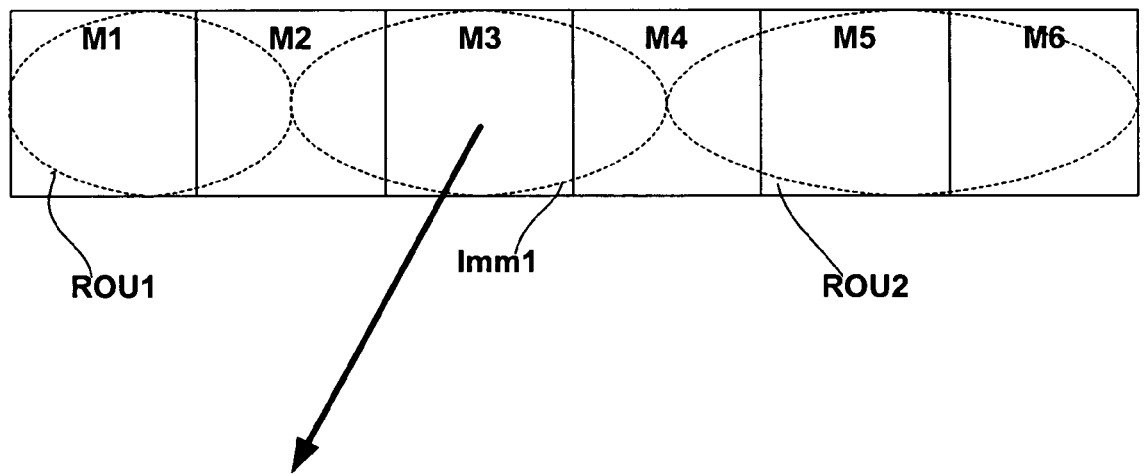

Thus, certain types of files are contemplated by the partial migration techniques of the present invention. An example of such a type of file is a stream of data having identifiable region(s) of update. FIG. 3A depicts an exemplary file having identifiable region(s) of update. File stream1 is depicted as the side to side junction of various storage blocks or on-disk allocation units M1, M2, . . . , M6, but it will be appreciated that storage blocks may be located anywhere and any number and types of storage elements and streams of data may have portion(s) migrated in accordance with the present invention. With data stream1, through an analysis of the file's usage history and/or because of a characteristic known about the file, two regions are identified to which updates or writes occur, shown as dotted regions of update ROU1 and ROU2. A third, immutable region Imm1 is also identified as infrequently updated or written to, or not updated at all. The size of the archive units, and size and location of the update region may be specified according to preset or input criteria as well.

The immutable data Imm1 may be migrated and is thus targeted for migration to a second storage location, such as remote storage or SAM. According to a presently preferred implementation, as stream1 grows, data beyond ROU1 is migrated out to long term storage, up to the beginning of ROU2. ROU2 continually lies at the end of stream1, and ROU2 moves forward as stream1 grows such that data beyond ROU2 is not migrated. Metadata is also generated for describing the portion(s) of the file migrated to remote storage relative to the unmigrated portions of the file. This metadata may be implemented according to any format suited to describing storage relationships and/or suited to the incorporation into various World Wide Web components. In an exemplary embodiment, metadata is formatted according to a distributed component object model (DCOM) description, but Java, extensible markup language (XML) and any other appropriate format may also be utilized.

FIGS. 3B and 3C show more particular or common examples of streams of data having an identifiable region of update, e.g., where data is added to the file at the beginning or end of the file. FIG. 3B shows the case where data is updated at the beginning of the file stream2. As time proceeds from t1 to t2 to t3, the file lengthens, but since data and its storage block falls out of the region of updates as the file grows, it may be migrated to other storage, such as SAM. At time t1, storage blocks or portions M3 and M4 can be migrated to remote storage, at t2, M5 may be migrated to remote storage and at t3, M6 may be migrated to remote storage, and so on. FIG. 3C shows the append only case, wherein the region of update is a portion at the end of file. Similarly to FIG. 3B, the portions of data stream3 that are not within the ambits of the region of update ROU may be migrated to remote storage. As the file grows from t1 to t2 to t3 and so on, new storage blocks may be migrated to remote storage, such as SAM. After registration for migration administration, at t1, M1 and M2 can be migrated, at t2, M3 can be migrated, and M4 can be migrated at t3.

For accessing migrated data, metadata is generated that describes the remote storage service utilized, describes the ranges of storage blocks that are migrated and describes other information such as the time of day of the last migration (See example below). It is noted that the metadata that describes the offset mappings for the migrated blocks of FIG. 3B may be generated 'backwards,' wherein the end of stream 2 is denoted offset zero in the metadata, and thus further blocks may be described relative to the zero offset, archive unit size and the file size.

Thus, when a file is accessed in an append only mode or when there is a "region of updates" that can be identified based on relevant file or system characteristics, then the system efficiently migrates those areas of the file that will not be updated i.e., the immutable or infrequently accessed portions. An example of such a file would be a record keeping file that adds each new additional record to the end of the file. Thus, once a record is entered, it may be considered a region of the file that probably will not be frequently accessed or updated, and therefore migrated to remote storage to preserve local memory limits or for other efficiency reasons. Thus, specialized hierarchical storage management techniques may be employed, whereby fractions of data stream(s) that have been stored in remote storage can be recalled, copied and/or read seamlessly to a user of the file server. In a preferred embodiment, the migrated data is written to sequential access media (SAM) and the data is advantageously immutable and secure once written to SAM.

Also, the present invention is applicable to a data stream of a file that has a well defined region of updates. For example, updates may happen by only appending bytes to the stream (append only case). A second case is when writes are directed to a last block of bytes of the stream (last block case). In the append only case, all bytes in the stream except those being appended are considered immutable, and consequently it is simple to identify which bytes can be partially migrated: the bytes already written. In the last block case, e.g., all bytes except a last block of bytes are considered immutable, and thus migratable.

In both the append only and the last block cases, a hierarchical storage management system may thus migrate the immutable region of the stream to remote storage. Advantageously, the partial migration of an immutable substream can happen even while the stream itself is being updated, by treating immutable portions differently from the file server standpoint. These specialized techniques for partial migration are not presently being used in conventional HSM systems.

The present invention also includes the ability to provide on-disk file memory allocation limits to limit the size of a file/stream. The present invention supports migration for such a constraint. Also, since the size of archive units and size(s) of region(s) of updates may be specified, when the size of the file is also limited due to a storage allocation limit, the present invention is a mechanism for enforcing the storage allocation limit. FIG. 3D illustrates an exemplary situation wherein a file's growth is limited by a storage allocation limit shown by the dashed line. The size of the archive units have been specified and the size of the region of update has also been specified. At t1, the file is allowably within the constraint. At t2, the file has reached the maximum size allowed by the constraint. At t3, its growth has exceeded the constraint, but portion(s) of the file may be migrated to remote storage, such as SAM, in accordance with the present invention, thereby preventing breach of the quota.

Figure 4:
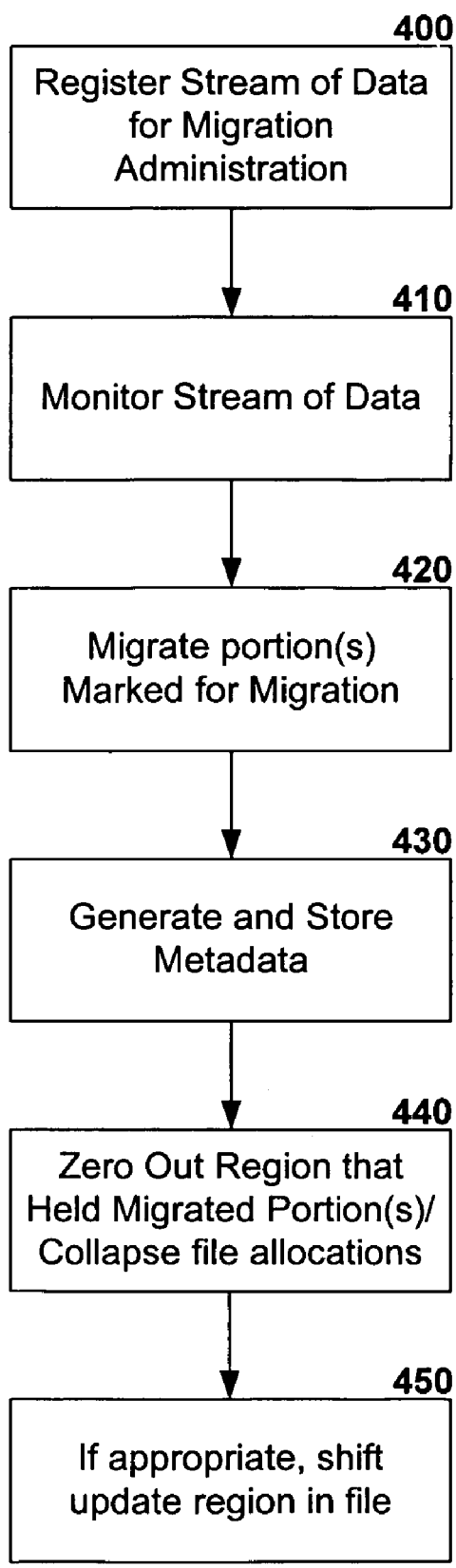
FIG. 4 is an exemplary flow diagram for migrating portion(s) of a stream of data to a secondary storage location in accordance with the present invention.

FIG. 4 illustrates an exemplary flow diagram for the method of partial migration in accordance with the present invention. At 400, a file can be registered for migration administration according to the present invention. The size of an update region, the size for an archive unit (the size of a portion to be migrated) and the migration destination for migrated data, for example, can be specified, and an on-disk memory allocation limit can be specified. At 410, the HSM system may make use of facilities to monitor the file for usage characteristics and/or the desirability of partial migration depending upon the file characteristics. At 420, portion(s) tagged for migration are migrated to a secondary location. At 430, metadata is generated descriptive of the file migration and the metadata is stored in a storage unit such as a database, preferably a jet database. This metadata may be used later to access the data stored in remote storage. At 440, the file server frees up the storage blocks or locations where the migrated data was previously stored. At 450, the region of update is shifted if it is appropriate for the file being serviced by the partial migration operations.

Of further advantage, the present invention provides for the re-assembly of all fractions of a stream in remote storage at any time without verifying whether the data represented thereby is still valid or not, since all fractions of a stream that have been migrated to remote storage are immutable. Further, if a region of a stream is deleted, the HSM system can represent the gap of bytes corresponding to the deleted region in its own internal system data. As a result, the HSM system may then, when convenient, re-assemble the remaining ranges of bytes to efficiently reclaim the storage formerly used by the deleted region.

In addition, the HSM system may choose any appropriate storage unit and transmission medium for migration. Choices are normally made to optimize instantaneous and/or high aggregate data rates of the transfer operations to remote storage.

As alluded to above, when a file is targeted for partial migration to remote storage, for each data stream and at any given time, there may be a storage quota that is to be observed according to preset rules. Thus, when the techniques of the present invention are used to preserve disk allocation limits through migration, advantageously, the volume on-disk allocations for the stream remain bounded while allowing the size of the stream to arbitrarily increase in size. As a caller of the file system writes data beyond a current file end point, the stream size correspondingly grows, as well as the number of disk allocations required to store the data of the stream. Once the quota of local allocation is exceeded, the HSM system of the present invention can migrate some of the file data to remote storage in order to reduce the amount of necessary on-disk memory allocation. The HSM system may select the range of bytes to migrate from the file, and the selection may adhere to a set of predetermined rules.

Thus, when selecting group(s) of bytes to migrate, a wide range of criteria may be used. For example, if the underlying data stream has been opened for sequential access, a logical region from which to migrate is a region that contains the bytes with the smallest offsets as reflected by current on-disk allocations. For another example, if the file has been opened for random access, then any range of bytes may be an equally good selection for migration. A statistical analysis of the file may also be revealing of portions suited to migration. For other alternatives, a HSM system in accordance with the present invention may track additional run-time information to determine which areas of the file are least likely to be accessed soon. The areas identified may then be designated for migration.

Preferably, the minimum unit of migration is equal to the minimum unit of storage allocation in the local file system, since the migration of smaller sizes minimizes the effects of de-allocating local storage. The invention preferably is used with file systems that support sparse files, wherein zero ranges within a data stream are deallocated. In a presently preferred implementation, the minimum unit of migration is taken as 64K. Also, the minimum unit for migration purposes does not have to be limited by the minimum allocation unit associated with the file system. The minimum unit size may be calculated according to several allocation units, e.g. 16 units, so as to minimize the amount of system data needed to track these memory allocations and to enable additional optimizations such as matching of the underlying unit of compression utilized by the file system. When a size is chosen that is appropriate to system parameters, the HSM system may thus optimize or streamline certain kinds of address translation operations. For example, presuming that powers of two are being used as the size of the transfer unit, then given an offset of a byte in connection with an access operation, the HSM system can quickly determine an internal address based on bit-shifting the given offset to the right by a number of bits equal to the log base 2 of the unit size. Other optimizations may be utilized in connection with other types of system parameters as well.

Also, the present invention is transparent to a user of the file server. Whether or not a file has been partially migrated, access is seamless because the HSM architecture integrates the functionality of the techniques. The method of archiving data to SAM thus allows access to all of the stream's data, including the migrated portions of the stream and the data stored in an on-disk allocation. In a presently preferred implementation of the present invention, the underlying file system has support for sparse files. All ranges of bytes or multiple regions that are migrated can thus be represented in the local file as being a "sparse hole" of bytes. It is also possible for the underlying files and file system to support data compression and decompression as well as data encryption and decryption.

Once a file is partially stored remotely due to a partial migration technique, a client may choose to move the file within its current volume or from one volume to another. A move operation generally refers to the action of changing the file's name, and as a result, the file can become the member of or become associated with a different directory and/or a different volume. In addition, inter-volume move operations involve source and target volumes, which may be managed by separate file managers possibly located on separate servers or machines. A move operation may also involve two separate processes: copying of data to a destination volume and deletion of data from the source volume. Thus, once portion(s) of a file have been migrated according to the present invention, a file system may be developed to handle typical migrated file re-location, move, copy, rename and other typical file operations. This could be accomplished, for example, by providing file migration information or metadata for use in connection with migrated file operations that specifies migration information for the file.

The present invention thus provides such a mechanism for defining metadata for a partially migrated file, whereby the metadata specifies the storage relationships for a partially migrated file. This metadata may be used by the HSM system to recognize the existence and nature of a partially migrated file and to efficiently perform operations in connection with the partially migrated file. This metadata may be encoded, for example, in DCOM, Java, in an extensible header, XML format and the like. The present invention has thus been developed in contemplation of partial migration of files, because present HSM systems do not adequately accommodate partial migration techniques.

While not intended to be limiting, an exemplary metadata description may include an identification of the remote storage service utilized in connection with migrated data, a description of the ranges of storage blocks that are migrated, and any other information that may be relevant such as the time of the last migration. For instance, the metadata for stream3 of FIG. 3C at time t3 may include the ID of the remote storage service used in connection with the migration of data. The metadata for stream3 at time t3 may also include a description of the ranges of storage blocks that are migrated. The unit used for range description could be the allocation unit. In the example of FIG. 3C, the range list may be:

M1: $<0, m_1>$
M2: $<m_1+1, m_2>$
M3: $<m_2+1, m_3>$
M4: $<m_3+1, m_4>$

Furthermore, the metadata may include temporal information describing, for example, when the last migration took place or when a current migration is taking place.

Figure 5:
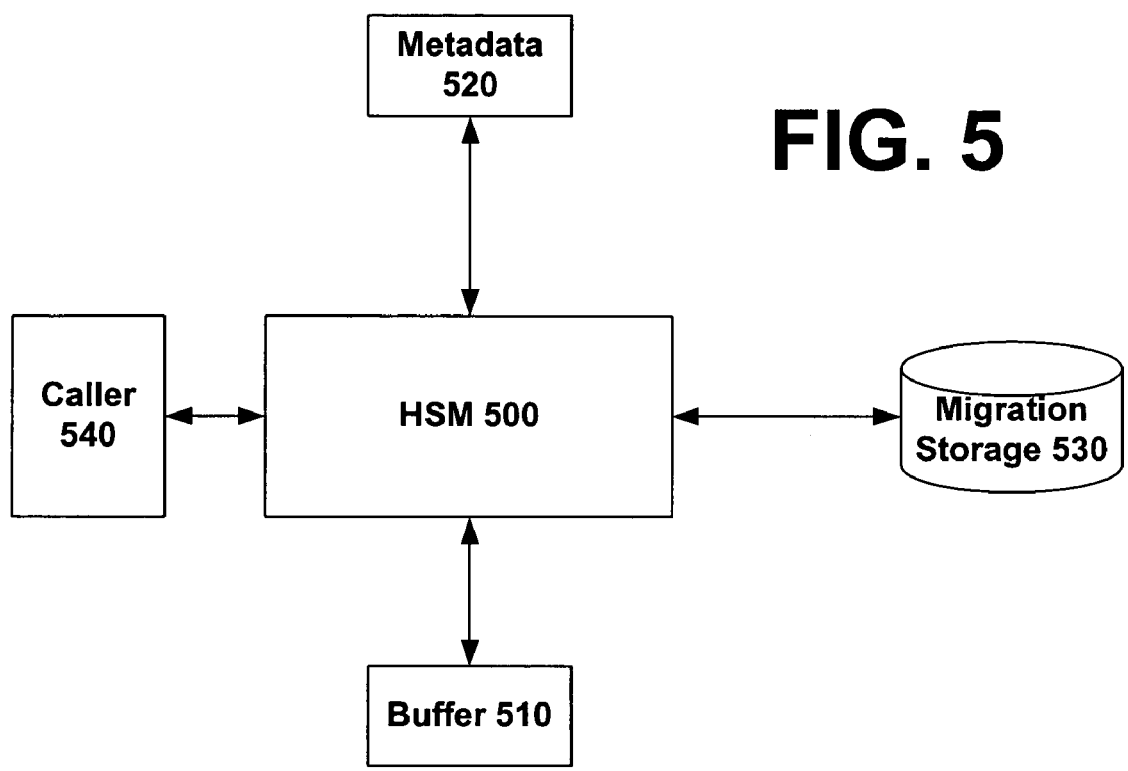
FIG. 5 is a block diagram illustrating an exemplary process wherein the HSM system recalls migrated data via metadata in accordance with the present invention.
Figure 6:
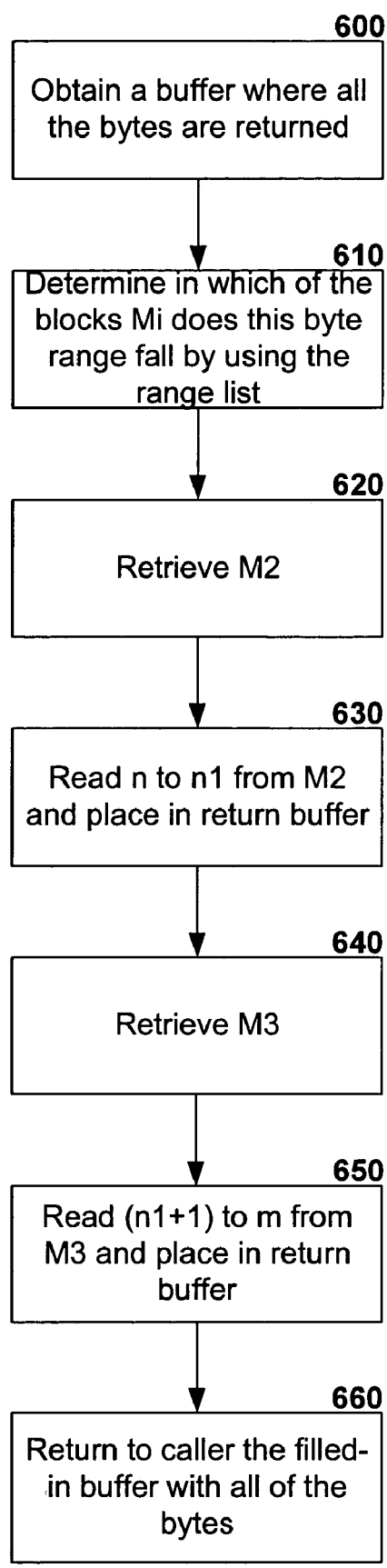
FIG. 6 is a flow diagram showing an exemplary process of recalling migrated data via metadata in accordance with the present invention.

With reference to FIGS. 5 and 6 and the above metadata description for stream3 at time t3, in response to a caller 540 for a range of bytes n to m in migration storage 530, a retrieval process by HSM 500 via the metadata 520 is illustrated. The metadata 520 may be stored in any type of storage element, such as a jet database. Caller 540 may be any type of object that makes calls to HSM 500 for data, such as an application, service, etc. Migration storage 530 may represent multiple storage units of any kind to which data has been migrated. At 600, the HSM 500 ensures the procurement of a buffer 510 where all of the called bytes n to m may be returned. At 610, the HSM 500 makes a determination as to which blocks Mi (Mi refers generically to any storage block such as M1, M2, M3, and so on) include data from the range n to m by reading from the above range list. Assuming that such a determination via the metadata description, for example, yields that n to $n_1$ are in M2 and that ($n_1$+1) to m are in M3, at 620, the data in M2 is retrieved from migration storage 530. At 630, n to $n_1$ are read from M2 and placed in the return buffer 510. At 640, the data in M3 is retrieved from migration storage 530. At 650, ($n_1$+1) to m are read from M3 and placed in the return buffer 510. At 660, with the buffer 510 having been filled with the requested range of bytes n to m, HSM 500 sends the requested range of bytes from buffer 510 to caller 540.

The method of maintaining migration information for partially migrated files may include defining a relationship between the file system metadata (used to describe attributes of a file and its location within the volume) and the location of the file's remote data extents. For example, if the interface to the back-end remote storage is implemented with DCOM enabled interface application programming interfaces (APIs), the part of the NT file server that maintains information about files' disk allocations may be located remotely from the part of the NT file server that manages the SAM's hardware.

The present invention thus describes methods and techniques that may be used in connection with the migration of portion(s) files from one storage location to another, and incorporates those methods and techniques into a flexible and efficient HSM system.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while sparse files may be used in connection with migrating files in accordance with the present invention, any file or stream of data of any type that may undergo growth or updating might be appropriate for partial migration techniques. Also, it should be understood that many different communications and network protocols may be suited to the generation and storage of file migration information (metadata) in accordance with the present invention. Furthermore, it should be emphasized that a variety of computer platforms, including handheld device operating systems and other application specific operating systems are contemplated. Therefore, the present invention should not be limited to any single embodiment, but rather construed in breadth and scope in accordance with the appended claims.

What is claimed is:

1. A method for migrating a portion of a stream of data having associated file system metadata via a file system from a first storage location to a second storage location in a computer system, comprising:

identifying at least one portion of the stream of data for migration to the second storage location;

migrating said at least one portion to said second storage location, wherein said migrating includes (A) relocating said at least one portion from the first storage location to the second location and (B) generating additional file system metadata relating to said stream of data; and preserving said stream's data relationships via said additional file system metadata, whereby said entire stream of data remains accessible to a user of the file system as if said at least one portion of the stream of data were not migrated according to said migrating.

2. A method according to claim 1, wherein said first storage location and said second storage location are located on different volumes.

3. A method according to claim 1, wherein said identifying of said at least one portion for migration includes identifying said at least one portion according to pre-set criteria.

4. A method according to claim 3, wherein said identifying of said at least one portion for migration includes specifying the size of an archive unit.

5. A method according to claim 3, wherein said identifying of said at least one portion for migration includes specifying the size of a region of updates.

6. A method according to claim 3, wherein said identifying of said at least one portion for migration includes specifying a memory allocation limit for the stream of data applicable to said first storage location.

7. A method according to claim 6, wherein said moving of said at least one portion is performed without exceeding said memory allocation limit.

8. A method according to claim 1, wherein the stream of data has at least one identifiable region of updates.

9. A method according to claim 1, wherein said identifying of said at least one portion for migration includes identifying a type of stream of data.

10. A method according to claim 9, wherein said type of stream of data is an append-only file.

11. A method according to claim 9, wherein said type of stream of data is a first storage block write only file.

12. A method according to claim 1, wherein said second storage location is a sequential access medium (SAM).

13. A method according to claim 1, wherein said first storage location is a local location and said second storage location is a remote location.

14. A method according to claim 1, wherein said first storage location is a non-secure storage location and said second storage location is a secure storage location.

15. A method according to claim 1, wherein said first storage location is an on-line location and said second storage location is an off-line location.

16. A method according to claim 1, wherein said preserving the data relationships of said stream includes generating metadata for description of said relationships.

17. A method according to claim 16, wherein said metadata for description of said relationships is formatted according to a scriptable interface capable of being incorporated into World Wide Web components.

18. A method according to claim 16, wherein said metadata for description of said relationships is formatted according to at least one of extensible markup language (XML), distributed component object model (DCOM) and Java.

19. A method according to claim 1, wherein the storage for said at least one portion in said first storage location is freed for use by the system after said at least one portion is moved to said second storage location.

20. A method according to claim 1, wherein said stream of data is a sparse file.

21. A computer-readable medium having computer-executable instructions for instructing a computer to perform the method recited in claim 1.

22. A data structure stored on a computer-readable medium for storing metadata relating to migration characteristics of a stream of data wherein at least one portion is migrated via a file system from a first storage location to a second storage location wherein said migration includes relocation of the at least one portion from the first storage location to the second location and generation of additional file system metadata relating to the stream of data, comprising:
 an identifier identifying the stream of data for which at least one portion is migrated;
 data representative of the storage service used in connection with the migration of said at least one portion; and
 data representative of the memory mappings of said at least one migrated portion, whereby said entire stream of data remains accessible to a user of the file system as if said at least one portion of the stream of data were not migrated.

23. A data structure stored on a computer-readable medium according to claim 22, further comprising temporal data relating to a time of migration of said at least one portion of said stream of data.

24. A data structure stored on a computer-readable medium according to claim 22, wherein said data structure is stored according to the format of a scriptable interface capable of being incorporated into World Wide Web components.

25. A data structure stored on a computer-readable medium according to claim 22, wherein said data structure is stored in at least one of extensible markup language (XML), distributed component object model (DCOM) and Java formats.

26. A data structure stored on a computer-readable medium according to claim 22, wherein said data structure is stored in a jet database.

27. A modulated data signal for carrying information that encodes a data structure as recited in claim 22.

28. An application programming interface (API) for use in a computer system, whereby a stream of data may register for administration for partial migration techniques according to the method of claim 1.

29. An API according to claim 28, whereby said interface provides a common way to generate and store metadata in connection with the partial migration of streams of data to secondary storage.

30. A computer system including a file system for migrating a portion of a stream of data having associated file system metadata from a first storage location to a second storage location in a computer system, wherein said migrating means to relocate the at least one portion from the first storage location to the second location and generate additional file system metadata relating to said stream of data, comprising:
 a hierarchical storage management (HSM) system for administering a stream of data for partial migration; and
 a source storage location having a stream of data stored thereon being serviced by said HSM system;
 wherein said HSM system identifies and migrates at least one portion of said stream of data to a target storage location according to pre-set criteria and generates metadata for the description of data relationships of said at least one migrated portion, whereby said entire stream of data remains accessible to a user of the file system as if said at least one portion of the stream of data were not migrated according to said migrating.

31. A computer system according to claim 30, wherein the HSM system specifies the size of an archive unit.

32. A computer system according to claim 30, wherein the HSM system specifies the size of a region of updates.

33. A computer system according to claim 30, wherein the HSM system specifies a memory allocation limit for the stream of data applicable to said source storage location.

34. A computer system according to claim 33, wherein the HSM system moves at least one portion of the stream of data such that said memory allocation limit is not exceeded.

35. A computer system according to claim 30, wherein the HSM system identifies a stream of data that has at least one identifiable region of updates.

36. A computer system according to claim 30, wherein said identifying by said HSM system of said at least one portion includes identifying a type of stream of data.

37. A computer system according to claim 36, wherein said type of stream of data is an append-only file.

38. A computer system according to claim 36, wherein said type of stream of data is a first storage block write only file.

39. A computer system according to claim 30, wherein said target storage location is a sequential access medium (SAM).

40. A computer system according to claim 30, wherein said source storage location is an on-line location and said target storage location is an off-line location.

41. A computer system according to claim 30, wherein said source storage location is a non-secure storage location and said target storage location is a secure storage location.

42. A computer system according to claim 30, wherein said metadata is formatted according to a scriptable interface capable of being incorporated into World Wide Web components.

43. A computer system according to claim 30, wherein said metadata for description of said relationships is formatted according to at least one of extensible markup language (XML), distributed component object model (DCOM) and Java.

44. A computer system according to claim 30, wherein the HSM system frees for use the storage for said at least one portion in said source storage location after said at least one portion is moved to said target storage location.

45. A computer system according to claim 30, wherein said stream of data is a sparse file.

* * * * *

UNITED STATES PATENT AND TRADEMARK OFFICE
CERTIFICATE OF CORRECTION

PATENT NO. : 6,981,005 B1
APPLICATION NO. : 09/644667
DATED : December 27, 2005
INVENTOR(S) : Luis Felipe Cabrera et al.

It is certified that error appears in the above-identified patent and that said Letters Patent is hereby corrected as shown below:

In column 13, line 34, delete "tom," and insert -- to m, --, therefor.

Signed and Sealed this

Twenty-ninth Day of September, 2009

David J. Kappos
*Director of the United States Patent and Trademark Office*